UNITED STATES PATENT OFFICE.

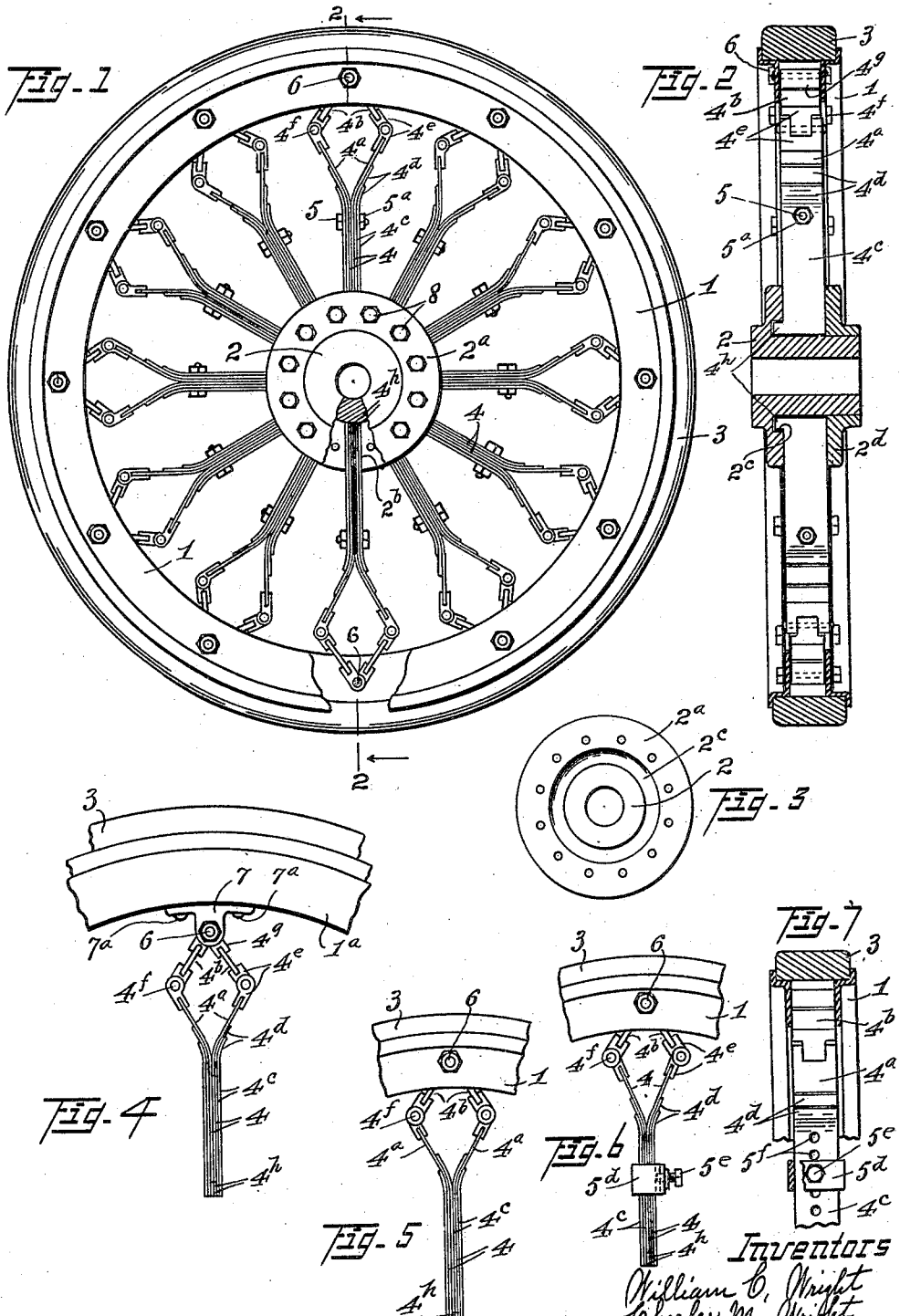

WILLIAM C. WRIGHT, OF SALEM, AND CHARLES M. WRIGHT, OF LISBON, OHIO.

RESILIENT VEHICLE-WHEEL.

1,400,844.  Specification of Letters Patent.  Patented Dec. 20, 1921.

Application filed June 25, 1920. Serial No. 391,662.

*To all whom it may concern:*

Be it known that we, WILLIAM C. WRIGHT and CHARLES M. WRIGHT, citizens of the United States, residing at Salem and Lisbon, respectively, in the county of Columbiana and State of Ohio, have invented certain new and useful Improvements in Resilient Vehicle-Wheels, of which the following is a specification.

Our invention relates to improvements in resilient vehicle wheels, and more particularly to that class or type in which the hub and felly members are connected to and movable relatively of each other by means of a series of movable spokes having sufficient resiliency or spring resistance to afford the requisite resiliency to the wheel as a whole.

The primary object of the invention is to provide a generally improved wheel of this class which will be simple in construction, cheap of manufacture, and efficient in use.

A still further object is the provision of improved means of assembling and disassembling the parts for the purpose of facilitating the replacement of parts when worn or broken, as well as the provision of improved bearings whereby the parts are properly braced during the relative movements of the wheel parts in practical operation, the parts of the improved wheel being so arranged and disposed relative to each other as to provide a generally improved wheel of great strength and stability having the requisite resiliency desired.

A still further and very important object is the provision of an improved form of spoke member particularly adapted not only to give the requisite radial and circumferential movement between the hub and felly members, but adapted to brace the wheel as against lateral strains and stresses in use.

A still further object is the provision of improved hub and felly connecting spring spoke members, together with improved means of securing and pivotally mounting and connecting the ends of said spoke members to the hub and felly portions of the wheel, respectively.

With the above mentioned and other ends in view, the invention consists in the novel construction, arrangement and combination of parts hereinafter described, illustrated in some of its embodiments in the accompanying drawings, and particularly pointed out in the appended claims.

Referring to the drawings, forming a part of this specification, Figure 1 is a side elevation of a wheel constructed in accordance with this invention, portions of the hub and felly members being broken away for the purpose of clearer illustration of the parts.

Fig. 2, a cross-sectional view taken on line 2—2 of Fig. 1.

Fig. 3, a view of the inner side of the hub members detached, the spokes and hub cap being removed.

Fig. 4, a fragmentary side elevation of a modified form of felly member and means of mounting the outer ends of the spoke members thereon.

Fig. 5, a side elevation of a modified form of spoke member.

Fig. 6, a side elevation of a modified form of spoke arm connecting and regulating device for regulating the resiliency or sensitiveness of the spring arms.

Fig. 7, a front elevation of the same, the felly being in section, and illustrating means for securing the sleeve or device in predetermined positions.

Similar numerals of reference designate like parts throughout all the figures of the drawings.

The improved wheel comprises a suitable felly member, 1, and hub member, 2. The felly and hub members, 1 and 2, may be of any suitable and convenient construction, and so likewise the tire, 3, thereof.

As a means of providing for the requisite radial and circumferential movements between the hub and felly members, as well as properly bracing the same as against lateral strains and stresses, a plurality of toggle link spoke members are provided, said spoke members preferably comprising main spoke members, 4, suitably mounted in the wheel hub, and extending outwardly and terminating in outwardly diverging branch or toggle arms, $4^a$, the ends of said arms, $4^a$, being pivotally connected to inwardly extending toggle links or arms, $4^b$.

As a means of resiliently resisting the action of the toggle arms, $4^a$ and $4^b$, in the movements of the wheel, and particularly also as a means of regulating the sensitiveness of such movements of the arms, $4^a$ and $4^b$, in accordance with certain superposed loads, the main spoke members, 4, are preferably made in the form of relatively flat spring members and are provided with superposed auxiliary spring members, $4^c$, on each side, said spring members, 4$^c$, extending over the diverging base portions of the branch or diverging arms, 4$^a$, and as a means of connecting the ends, 4$^d$, of the auxiliary spring members, 4$^c$, to each other as likewise connecting the branch arms, 4$^a$, to prevent the undue spreading of the latter as well as to regulate the tension of the same, suitable spring connecting and adjusting members, 5, are provided, said connecting and adjusting elements, in the present instance, being in the specific form of bolts passing through suitable openings and provided with adjusting nuts, 5$^a$.

As a means of connecting the ends of the toggle arms, 4$^a$ and 4$^b$, together, such ends may be provided with bearing or hinge members, 4$^e$, connected by means of pivot elements or bolts, 4$^f$.

The outer or converged ends of the links, 4$^b$, may be provided with similar bearing members, 4$^g$, arranged and connected in a manner similarly to the members, 4$^e$, and connected to each other as well as to the wheel felly by means of bearing members, 6, in the specific form of bolts, suitably connected to the wheel felly, such connection in the form shown in Figs. 1, 2, 5, 6 and 7 of the drawings, passing through the side or flanged portions of the wheel felly, such flanges acting also to brace the links, 4$^b$, as against lateral displacement. As a modified form, the links, 4$^b$, may be connected to the inner periphery of an ordinary solid or wooden wheel felly, 1$^a$, by means of attaching clips, 7, secured by means of attaching elements, 7$^a$, as shown in Fig. 4 of the drawings.

As a means of mounting the spoke members, 4, and auxiliary spring members, 4$^c$, in the hub of the wheel, the hub is provided with a flange, 2$^a$, at one side and is provided with a series of radially extending recesses, 2$^b$, adapted to receive and contain the base ends of the spoke and spring members, and as a means of preventing the pulling out of the spoke members, the base ends of the latter are provided with laterally extending lugs, 4$^h$, adapted to extend into an annular groove or recess, 2$^c$, in the inner face of the hub flange as shown most clearly in Figs. 2 and 3 of the drawings.

As a means of removably mounting and securing the inner ends of the spring or spoke members in seated position when assembled in the hub, a hub cap or plate, 2$^d$, is adapted to bear on one side of the link of the spoke and spring members and may be secured by means of connecting bolts, 8, passing through the main hub, 2.

As a means of connecting and adjusting the auxiliary spring ends, 4$^d$, and branch toggle arms, 4$^a$, in lieu of the members, 5, shown in Figs. 1 and 2 of the drawings, a connecting and adjusting member in the specific form of a sleeve or clip, 5$^b$, may be employed as shown in Figs. 6 and 7 of the drawings, and in which instance the sleeve, 5$^b$, may be secured in adjusted positions by means of a clamp or set bolt, 5$^e$, adapted to be secured and seated in recesses, 5$^f$.

Having thus described some of the embodiments of our invention, without having attempted to set forth all the forms in which it may be made or all the modes of its use, what we claim and desire to secure by Letters Patent, is,—

1. A resilient wheel, comprising hub and felly members, leaf spring spokes connected to said hub member and terminating in diverging spring resisted branches, and outwardly converging links pivotally connected to the latter and said felly member.

2. A resilient wheel, comprising hub and felly members, spokes connected to said hub member and terminating in diverging toggle arms, toggle links pivotally connected to the latter and said felly member, auxiliary spoke springs in said hub member having their ends extending over the base portions of said diverging toggle arms, and sleeves adjustably mounted on said auxiliary spoke springs for regulating the sensitiveness of said felly member relative to said hub.

3. A resilient wheel, comprising hub and felly members, leaf spring spokes interposed therebetween, and comprising main and auxiliary spring spokes terminating in resilient arms diverging toward said felly member, toggle link members pivotally connected to said diverging arms and said felly member, and means for connecting said spring spokes and adjusting the sensitiveness of the latter and said toggle link members.

In testimony whereof we have affixed our signatures.

WILLIAM C. WRIGHT.
CHARLES M. WRIGHT.